March 7, 1939.                    W. H. BRUNS                    2,149,418
                            ELECTROMAGNETIC DEVICE
                            Filed Jan. 22, 1938          2 Sheets—Sheet 1

William Henry Bruns INVENTOR

BY Walter E. J. Bradley ATTORNEY

March 7, 1939. W. H. BRUNS 2,149,418
ELECTROMAGNETIC DEVICE
Filed Jan. 22, 1938 2 Sheets-Sheet 2

William Henry Bruns INVENTOR
BY Matthew E. J. Bradley ATTORNEY

Patented Mar. 7, 1939

2,149,418

UNITED STATES PATENT OFFICE 2,149,418

ELECTROMAGNETIC DEVICE

William Henry Bruns, Lincolndale, N. Y., assignor to Otis Elevator Company, New York, N. Y., a corporation of New Jersey Application January 22, 1938, Serial No. 186,297

2 Claims. (Cl. 175—341)

The present invention relates to electromagnetic devices and especially to electromagnets having movable cores.

Electromagnets with movable cores have many applications. In certain instances two oppositely moving cores are provided and are connected to operating members to effect their opposite movement. In other instances only one movable core is provided, which is arranged to cooperate with a stationary core. The invention is especially directed to electromagnets of this character.

It is the object of the invention to provide an electromagnet which is efficient and quiet in operation and which admits of considerable wear of the various operating parts with which it is associated without materially affecting the operation.

The invention involves controlling the change of flux across the air gap throughout the stroke of the electromagnet. In carrying out the invention, the opposed core faces are constructed to provide an intermeshing relationship. This relationship is varied throughout the stroke in such way as to provide a change of flux which produces a certain pull upon energization of the electromagnet and, if desired, a dampening effect upon deenergization of the electromagnet. More specifically, the core faces are formed with a plurality of depressions to provide intermeshing projections. In the construction illustrated, straight parallel slots are provided crosswise of the core faces with the teeth formed thereby shaped to give the desired flux change throughout the stroke.

Features and advantages of the invention will become apparent from the following description and appended claims.

The invention will be described as applied to an electromagnetic brake for elevators. Application of the invention to an elevator retiring cam electromagnet will also be described.

In the drawings:—

Figure 1:
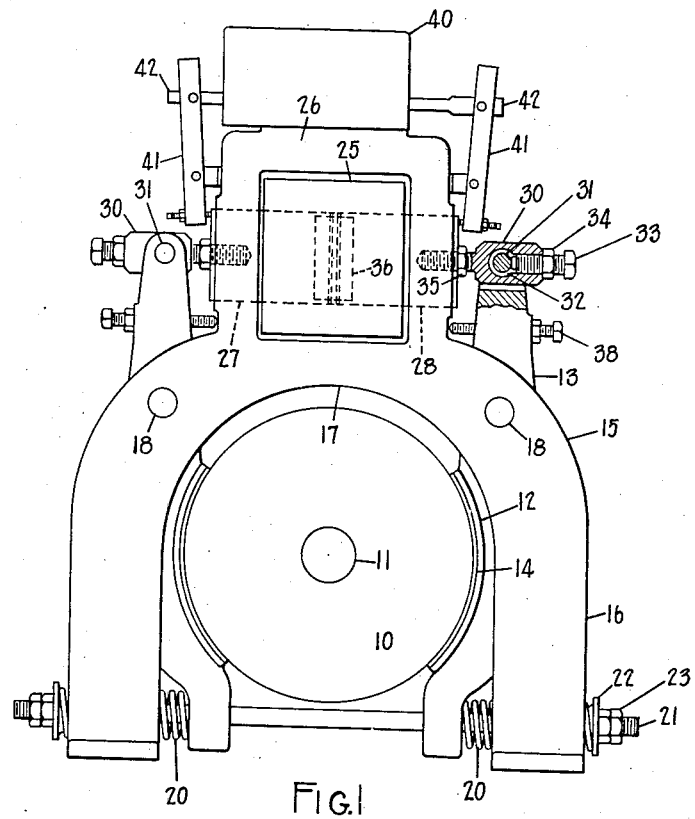
Figure 1 is a side elevation of an electromechanical brake embodying the invention.

Referring first to Figure 1, the invention has been illustrated as applied to a brake of simple construction. Also, for convenience, the illustration has been simplified. The brake drum 10 is mounted on shaft 11. The brake shoes 12 for engaging the drum are formed on brake levers 13, each shoe being faced with brake lining 14. The levers are pivotally mounted above the shoes on the brake frame 15. This frame is of an inverted U construction, having legs 16 and yoke 17. The legs are formed of two sides, the brake levers being positioned between the sides and supported on pins 18 extending through the sides.

The brake shoes are spring applied, a pair of springs 20, one for each brake shoe, being provided on opposite ends of a rod 21 extending between the lower ends of the brake levers. Each spring is arranged between the end of the lever and a washer 22 arranged on rod 21 and is adjusted to and held in the desired state of compression by means of adjusting and lock nuts 23. The brake shoes are electromagnetically released, the coil 25 of the electromagnet being mounted on a frame 26 on the top of yoke 17. The coil is provided with two oppositely movable symmetrically arranged brake cores 27 and 28. These cores are secured to the brake levers by means of eye bolts 30 and pins 31. The upper end of each brake lever is slotted to receive the eye bolt and the pin extends through the sides of the slot and the aperture 32 in the eye bolt. The aperture 32 is considerably larger than pin 31, an adjusting bolt 33 being provided for adjusting the relationship of the brake lever to the eye bolt. A lock nut 34 is provided for locking bolt 33 in adjusted position. Also, a lock nut 35 is provided for each eye bolt for locking it in position. A key 36 extending into slots 37 in the cores serves as a guide for the cores and also acts as a stop to limit their inward movement upon release of the brake shoes by the electromagnet. Each lever is provided with an adjustable stop bolt 38 for insuring the lifting of both brake shoes from the brake drum upon energization of magnet coil 25.

In operation, upon energization of the magnet coil 25, the cores 27 and 28 are pulled toward each other, acting through their respective eye bolts 30 and pins 31 to pull the upper ends of the brake levers inwardly about their pivot pins, thereby releasing the brake shoes from the brake drum against the force of springs 20. If, for any reason, one shoe should lift before the other, its stop bolt 38 strikes the brake frame upon the core reaching a certain position, forcing the lifting of the other brake shoe. When wear of the brake linings has taken place, this may be taken up by screwing the adjusting bolts 33 outwardly sufficiently to compensate for this wear. This results in pin 31 assuming a position to the outside of the center of the aperture 32 in the eye bolt. The compression of springs 20 is also readjusted. On the top of the housing for the brake magnet coil is a switch structure arranged in a casing 40. This switch is operated by the brake cores 27 and 28 by means of levers 41 and links 42.

Figure 3:
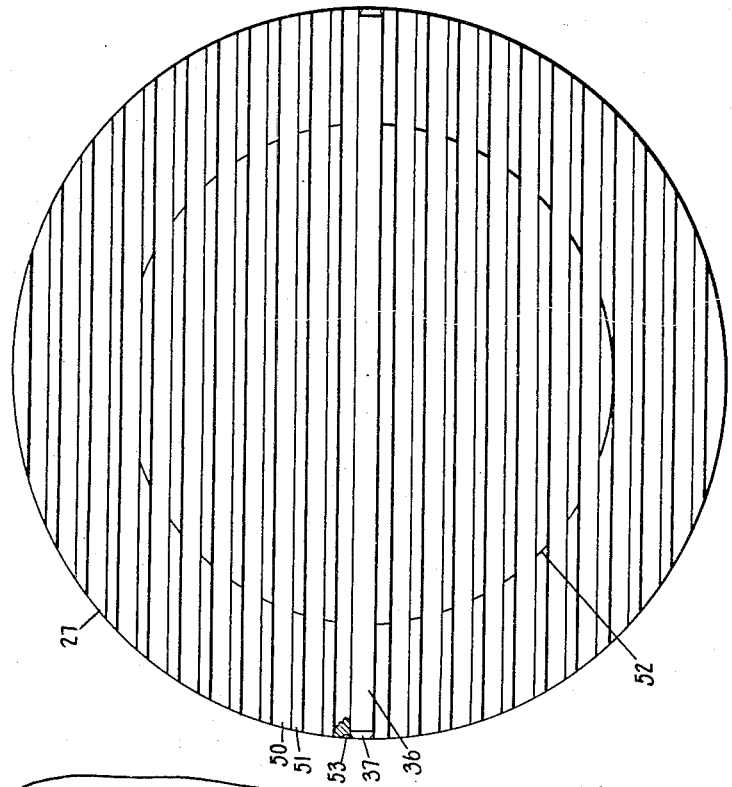
Figure 3 is an enlarged detail of the face of one of the cores of Figure 2.
Figure 2:
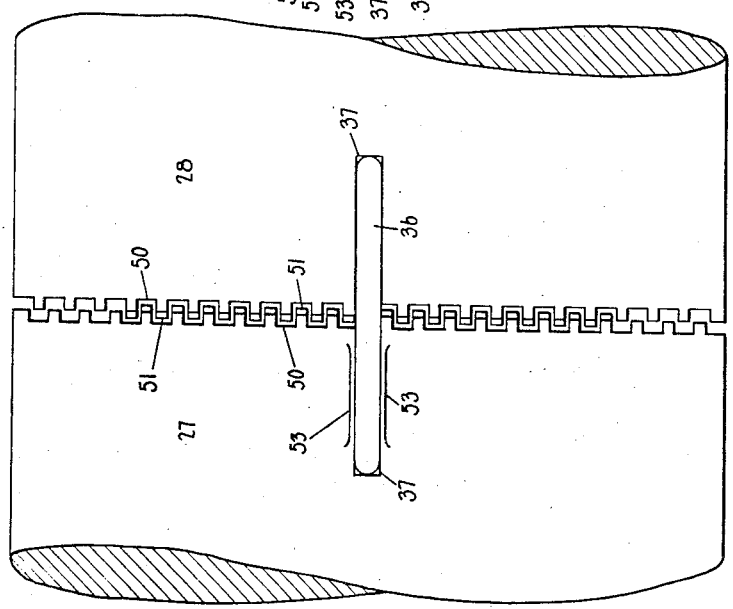
Figure 2 is an enlarged detail in side elevation of the adjacent ends of the cores of the brake of Figure 1.

Referring now to Figures 2 and 3, the adjacent ends of the brake cores are formed with a plurality of parallel slots 50 to provide a plurality of teeth 51 extending crosswise of the core faces. The slots are wider than the teeth and the slots in one core are staggered with respect to those of the other to permit the teeth to intermesh. The height of the teeth of each core outside the circle 52 is less than the height of the teeth inside the circle. The slots 37 for key 36 extend through the center of the cores parallel with slots 50. With this construction both cores may be made exactly alike. The slots 37 provide a close fit for the key. This insures the slots 50 in the two core faces being maintained in parallel relationship, thus obviating any possibility of the teeth of the two cores getting misaligned and striking each other in operation. The key is secured to one of the cores as by swaging at the points 53. It is of non-magnetic hardened steel to permit ready movement of the cores and withstand the blow of bringing the cores to a stop upon release of the brake shoes.

The key 36 is of a length such that with the cores in attracted position, a certain clearance exists between the top of the teeth and the bottom of the slots into which they extend. The eye bolts 30 and screws 33 are adjusted initially so that with the brake shoes fully applied the teeth within circle 52 are already in mesh. For example, in one construction which has proved satisfactory, brake cores of 3⅝ inches diameter are provided with teeth 3/32 inch high within a circle 52 of 2½ inches diameter and 1/16 inch high outside this circle, with the teeth 1/16 inch wide and the slots 3/32 inch wide. The key is of such length and the brake is initially adjusted so that the top of the teeth within circle 52 is at a distance from the bottom of the grooves into which these teeth extend of substantially 1/16 inch with the brake shoes applied and 3/32 inch with the brake shoes released.

With such arrangements, by supplying a certain amount of excitation to the magnet coil, say 5000 ampere turns in the example given, ample force is exerted to lift the brake shoes from the drum without slamming as the cores are brought to a stop. The pull which the magnet is capable of exerting is substantially constant throughout its operating range, that is, from brake applied position to brake released position. In other words, the brake has a substantially flat pull curve. Thus the brake is positive and quiet in operation and the number of ampere turns required to lift the brake is a minimum. The pull curve for the brake remains substantially flat over a considerably greater operating range than that had by the brake as initially adjusted, extending to the condition where, due to wear of the brake linings, the teeth are well out of mesh. This is due to the fact that the intermeshing relationship of the teeth throughout this range is such that the change of flux throughout the stroke of the magnet is such as to cause such pull. Thus ample force to lift the brake shoes is assured under operating conditions even when considerable wear of the brake linings has taken place and has not been taken up by adjustment. This is of particular advantage as it insures uniform operation in lifting the brake and advantage may be taken of this characteristic, where delayed action is desired, to insure substantially constant dampening of the brake in applying the shoes to the drum, as by providing a discharge circuit for the brake magnet coil.

There is added advantage in the large number of teeth as the total flux for a given excitation is greater than if a small number of teeth were provided. This adds to the efficiency of the brake as it further reduces the number of ampere turns required to lift the brake. The parallel arrangement of slots is of advantage because it minimizes the cost of manufacture, the slots simply being milled across the faces of the cores. Other arrangements, however, may be provided without departing from the principles of the invention. For example, the area of teeth of a certain height may be distributed in any suitable way over the core faces. Also, in certain arrangements it may be desirable to gradually decrease the height of the teeth instead of by a step. If it is desired to alter the pull curve of the brake magnet somewhat, this may be readily done by altering the contour or size of the teeth.

Brake core construction embodying the principles of the invention is of particular value for use where the power supply is alternating current and the brake magnet coil is supplied with direct current from a rectifier connected to the alternating current source. The construction having a pull curve with a flat top characteristic and thus providing a maximum amount of work with minimum excitation, effects a decrease in the size and cost of the rectifier and also the transformer, if used. Such construction is also of particular value in systems where it is desired to control the rate of application of the brake shoes as by varying the amount of discharge resistance connected across the brake magnet coil in accordance with the net load on the hoisting motor.

Figure 4:
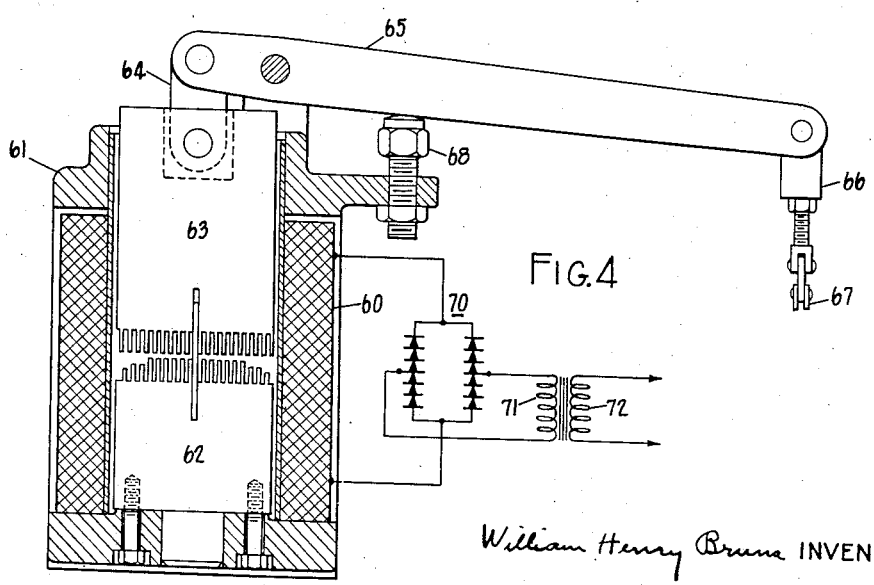
Figure 4 is a diagrammatic representation of simplified circuits illustrating a retiring cam electromagnet embodying the invention.

Although described as applied to an electromechanical brake construction in which both cores are movable, it is to be understood that the invention is also applicable to constructions in which one core is stationary with respect to the magnet coil. Also, the invention is applicable to electromagnets for operating other devices. An application of the invention to an electromagnet for retiring a cam employed in elevators to operate the door locks is illustrated in Figure 4.

Referring to this figure, the retiring cam electromagnet comprises a magnet coil 60 and a frame 61 mounted on the elevator car. The coil is provided with two cores 62 and 63, the bottom core 62 being secured to the magnet frame and the upper core being connected by a link 64 to a lever 65 pivotally mounted on the frame. The end of lever 65 is connected by an eye bolt 66 leading through chain 67 to the retiring cam. A bumper 68 is adjustably secured to a lug on the magnet frame for bringing the lever 65 to a final stop upon deenergization of the magnet coil and for supporting the lever in that position until the magnet coil is again energized to retire the cam. The faces of the cores 62 and 63 are slotted and provided with a guide key similar to the arrangement of the brake cores previously described.

A simple circuit arrangement for the magnet coil is indicated in which current is supplied thereto from a rectifier 70 connected to a source of alternating current through a transformer having a secondary winding 71 and primary winding 72. The energization of the magnet coil may be controlled by making and breaking the circuit to the primary of the transformer. With this arrangement, upon interrupting the supply circuit, the current in the magnet coil is caused to die out gradually by a discharge circuit through the rectifier.

For example, in one arrangement which has proved satisfactory and in which cores of 2⅞ inch diameter having teeth $\frac{1}{16}$ inch wide and slots $\frac{3}{32}$ inch wide are employed, the teeth of the upper core 62 are formed without steps and are $\frac{5}{16}$ inch high. Three steps of teeth are formed on the lower core, the inner circle being $2\frac{1}{16}$ inches in diameter and the intermediate circle being $2\frac{9}{16}$ inches in diameter. The height of the teeth within the inner circle is ⅜ inch, of those between the inner and intermediate circle ¼ inch and of those around the outside $\frac{5}{32}$ inch. With approximately 4200 ampere turns excitation and with the construction adjusted so that the top of the teeth within the inner circle is at a distance from the bottom of the grooves into which these teeth extend of substantially $\frac{23}{64}$ inch with the cam retired and $\frac{7}{64}$ inch with the cam released, a pull curve is provided which in retiring the cam gives a high initial pull which decreases as the cam is lifted so that the cores come to a stop without slamming and in releasing the cam, due to the discharge circuit, maintains sufficient pull to lower the cam quickly and yet quietly and easily.

As many changes could be made in the above arrangements and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. An electromagnetic device comprising, a magnet coil, a pair of identical cores extending into said coil from opposite ends thereof so as to be pulled toward each other upon energization of said coil, each core being provided with a plurality of parallel slots extending across its face to form teeth, a certain percentage of the face area of said teeth being of a height different from the remainder, the slots of one core being staggered with respect to those of the other, each core being also provided with an additional slot, said additional slots being aligned with each other and parallel with the first named slots, a non-magnetic key extending into said additional slots to guide said cores during their movement, said key being secured in one of its slots and being of a length to engage the bottom of the other of its slots during said movement of the cores to bring the cores to a stop, and means connected to said cores to be operated thereby.

2. An electromagnetic device comprising, a magnet coil, a pair of identical cylindrical cores extending into said coil from opposite ends thereof so as to be pulled toward each other upon energization of said coil, each core being provided with a plurality of of parallel slots extending across its face to form teeth, and having its face arranged with at least one step within a circle concentric with the circumference of such core to provide teeth of a greater height than those outside the circle, the teeth of one core being staggered with respect to those of the other and those teeth of one core within said circle being partially in mesh with the corresponding teeth of the other core when said coil is deenergized, said cores thereby exerting a substantially constant pull throughout their stroke upon energization of said coil, each core being also provided with an additional slot, said additional slots being aligned with each other and parallel with the first named slots, a non-magnetic hardened steel key extending into said additional slots to guide said cores during their movement, said key being secured in one of its slots and being of a length to engage the bottom of the other of its slots during said movement of the cores to bring the cores to a stop with said teeth of each core within said circle at a certain distance from the bottom of the slots of the other core into which they extend, and means connected to said cores to be operated thereby.

WILLIAM HENRY BRUNS.